Figure 1:
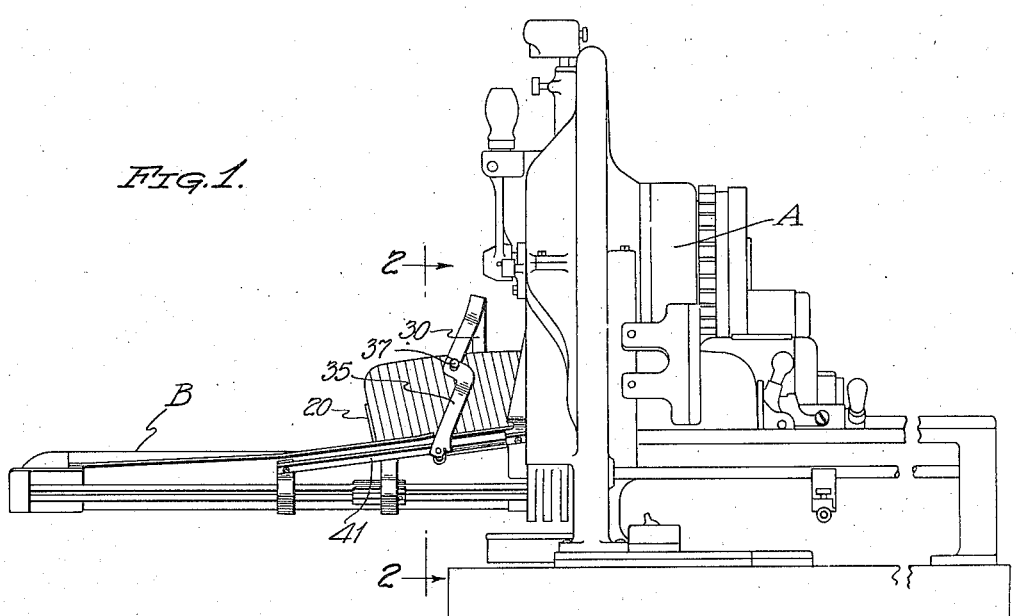

Jan. 3, 1939.  M. BRUSTOWSKY  2,142,812
TRAY FOR BREAD SLICING MACHINES
Filed Aug. 29, 1936   2 Sheets-Sheet 1

MORRIS BRUSTOWSKY.
INVENTOR.
BY Ely Pattison,
ATTORNEYS.

WITNESS:

Jan. 3, 1939. M. BRUSTOWSKY 2,142,812
TRAY FOR BREAD SLICING MACHINES
Filed Aug. 29, 1936 2 Sheets-Sheet 2
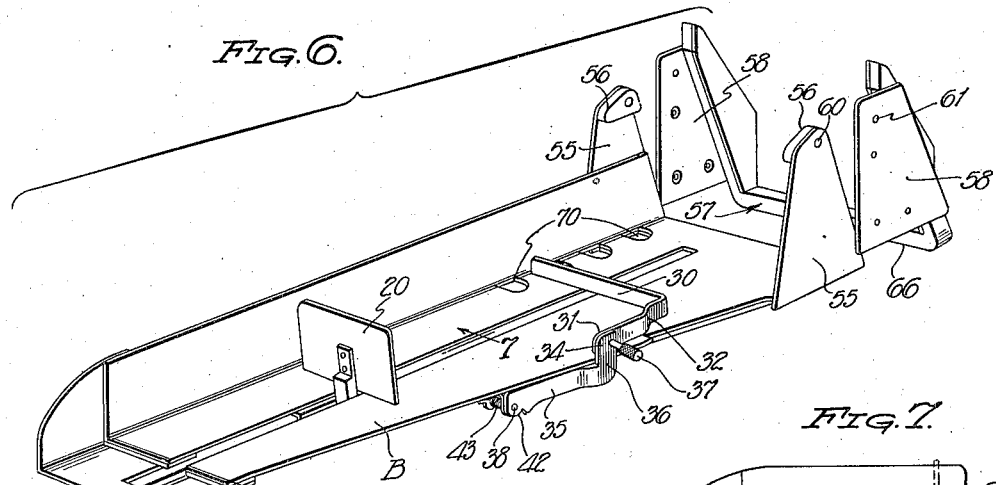
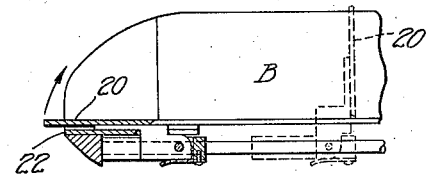
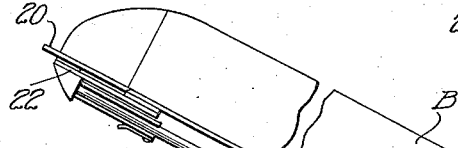
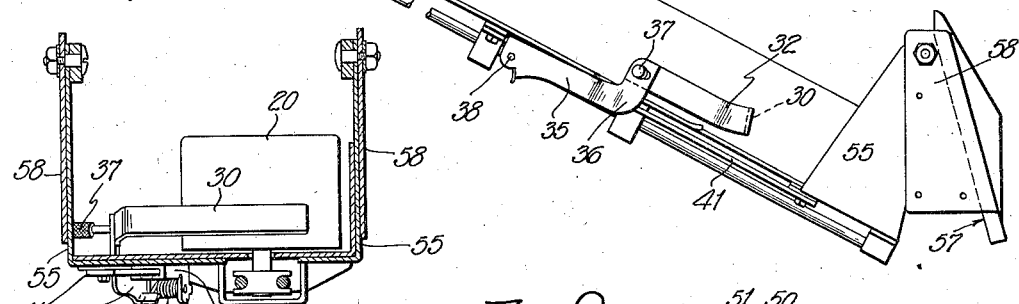
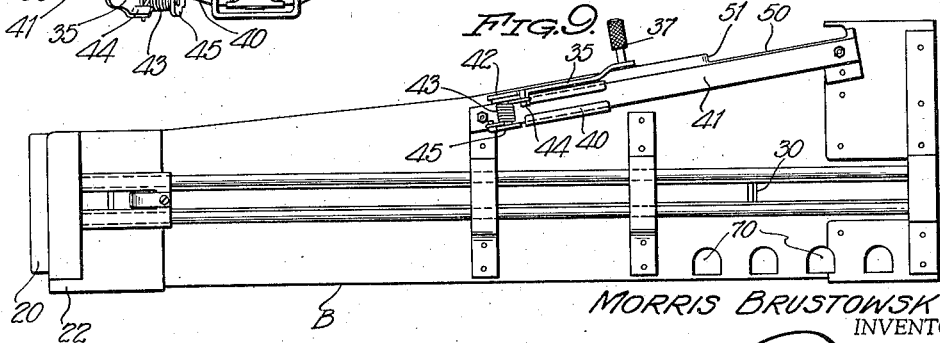
MORRIS BRUSTOWSKY,
INVENTOR.
BY Ely Pattison
ATTORNEYS.

Patented Jan. 3, 1939

2,142,812

UNITED STATES PATENT OFFICE 2,142,812

TRAY FOR BREAD SLICING MACHINES

Morris Brustowsky, Brooklyn, N. Y.

Application August 29, 1936, Serial No. 98,552

7 Claims. (Cl. 146—94)

This invention relates to new and useful improvements in receiving trays for slicing machines and while the invention is capable of use with various types of slicing machines, it particularly lends itself to use in connection with machines for slicing bread.

In all machines for slicing bread with which I am familiar, it is necessary to insert the hand between the last slice severed from the loaf and the knife of the machine in order to remove the severed slices from the slice receiving tray, it being understood that the slices are moved along the receiving tray and discharged therefrom into a bag, wrapper or other suitable container.

It is an object of the present invention to provide a new and novel means whereby the severed slices of bread may be moved away from close proximity to the knife without necessitating the touching of the severed slices with the hand.

Also, all such machines with which I am familiar have the undesirable feature of damaging the lower edge of the severed slice during the severing operation, and it is a further object of the present invention so to construct a bread slicing machine that all of the edges of the several severed slices will be unbroken or undamaged in any way.

Another object of the invention resides in a novel construction and arrangement of parts whereby the means employed for moving the severed slices occupies a normal position of rest out of the path of travel of the several slices as they pass from the bread slicing machine to the receiving tray, and yet said means is capable of two movements, to wit, one preferably a pivotal or swinging movement into engagement with one of the severed slices, and the other a sliding movement along the tray.

It is a still further object of the invention so to construct the device that when the means which operates to move the severed slices longitudinally of the receiving tray is in its normal position of rest, it is capable of only its first movement into engagement with one of the severed slices, and when it is operating to move the severed slices longitudinally of the receiving tray, it is capable of only said reciprocating movement.

It is a further object of the invention to provide a new and novel means for attaching the receiving tray to the bread slicing machine, which means will permit of swinging movement of the tray relatively to the slicing machine, which construction permits of easily cleaning the machine, since it permits of easy removal of the crumbs at that point where the cutting operation is performed.

Still a further feature of the invention resides in the novel manner in which I use a portion of this attaching means to support the slice being severed during the severing operation, thus insuring a clean cutting operation without damage to the edges of the slice with a consequent better appearing slice and the production of fewer crumbs.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 3:
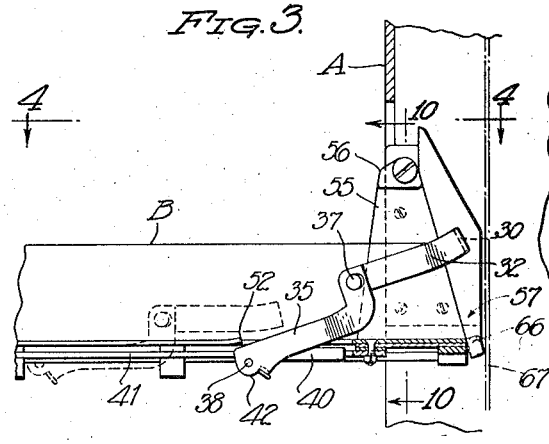
Figure 2:
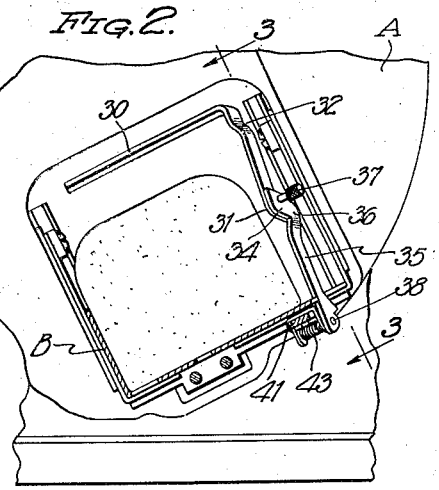
Figure 4:
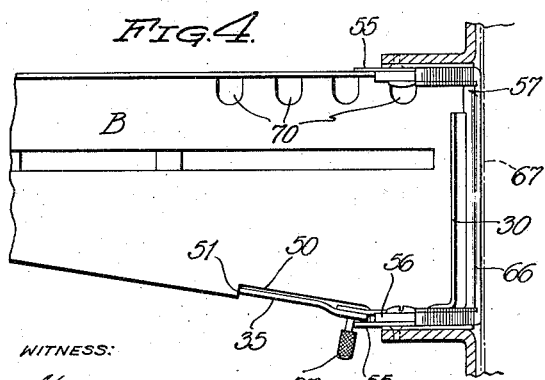
Figure 5:
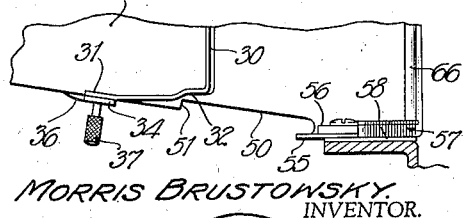

Referring more particularly to the drawings,

Figure 1 is a view in side elevation of a bread slicing machine illustrating a receiving tray provided with the construction forming the subject matter of this invention, Figure 2 is a vertical sectional view taken substantially on the line 2—2 of Figure 1, Figure 3 is a detail sectional view taken substantially on the line 3—3 of Figure 2, Figure 4 is a horizontal sectional view taken substantially on the line 4—4 of Figure 3, Figure 5 is a detail sectional view showing the parts in one of their operating positions, Figure 6 is a distended perspective view of the receiving tray and its attaching means, Figure 7 is a detail sectional view on an enlarged scale taken substantially on the line 7—7 of Figure 6, Figure 8 is a view in side elevation showing the receiving tray in an elevated position, Figure 9 is a bottom plan view of the receiving tray, and;

Figure 10 is a transverse vertical sectional view taken substantially on the line 10—10 of Figure 3.

Referring to the accompanying drawings by reference character, A designates a slicing machine for slicing bread, which machine may be of any desired type employing a rotary knife, and B designates a receiving tray.

The tray B is substantially of the type disclosed in my prior Patent Number 2,035,259 issued March 24, 1936, and is so constructed and arranged that the severed slices of bread may be moved along the tray and discharged from the end thereof into a suitable bag or other container. An abutment member 20 travels along the tray as the slices are fed thereto and when the abutment reaches the point 21, it may fold downwardly onto a suitable supporting member 22, as illustrated in Figure 7. In this position it leaves the top surface of the tray smooth and unobstructed for the free movement of the severed slices thereover. The construction by which this result is obtained is clearly set forth in my prior patent above mentioned.

In slicing machines of this character, the last slice delivered to the receiving tray occupies a position closely adjacent the knife of the slicing machine. This condition requires that the operator, in order to move the severed slices along the tray, must insert his hand between the last slice severed and the knife to engage the end slice of the group and move the same along the tray. This is not only an awkward operation but is also a more or less dangerous one and the present invention contemplates means for engaging the last severed slice and moving the group of severed slices to a position far enough remote from the knife to render the discharge operation easily and safely effected.

This means afore-mentioned comprises a two part arm, one part of which consists of an extension 30 and a body portion 31, which latter is slightly off-set as at 32. This portion of the arm is rigidly connected as at 34 to an arm 35 having an off-set end 36. An operating handle 37 is provided and by this means the entire arm may, under certain operating conditions, be swung about its pivotal point 38. The portion 30 overlies the receiving tray and extends transversely thereof as shown. The arm is pivotally mounted as at 38 upon a carriage 40, and this carriage is slidably mounted upon a trackway 41 rigidly secured to the under side face of the tray. Mounted in a suitable bracket 42 there is a coil spring 43, see Figure 9, one end of which engages a projection 44 of said arm, the other end engaging a projection 45 rigidly mounted upon the under face of the frame. This spring and its associated parts are so arranged that it is the tendency of the spring to at all times throw the two part arm to its normal position of rest, in which position it is shown in Figure 1, wherein it is elevated with respect to the tray and is, therefore, out of the path of travel of the severed slices as they are delivered from the slicing machine to the receiving tray.

As best shown in Figure 4, one side edge of the receiving tray is cut away as at 50 to provide a shoulder 51, and by reference to the same figure, it will be noted that during certain stages of operation, the portion 35 of the two part arm occupies a position beneath this shoulder 51. As best illustrated in Figure 3, this shoulder is turned upwardly as at 52 to provide a cam to operate upon the top edge of the portion 35 of the two part arm.

The tray is provided at its forward portion with wings 55 each of which has a bearing 56. The reference numeral 57 designates a U-shaped member which has wings 58, and these wings 58 provide for attachment of the U-shaped member to the frame of the slicing machine. The bearings 56 and the wing members 55 have openings 60 which are adapted to register with openings 61 in the wings 58 of the U-shaped member and by passing bolts through these registered openings, the receiving tray is pivotally mounted between the said wings 58, thus providing means for attachment of the receiving tray to a slicing machine.

With the parts in the position in which they are shown in Figure 1, which is the normal position of rest of said parts, the severed slices of bread are free for delivery to the receiving chute, the arm being in its elevated position and out of the path of travel which the slices take as they are delivered from the bread slicing machine.

After the loaf has been sliced, the operating handle 37 of the arm is grasped and the arm is rocked downwardly, as illustrated in Figure 3. In this downward movement, the extension 30 of the arm passes between the last severed slice of bread and the knife. When the arm is in its normal position of rest the same cannot be moved rearwardly of the chute or to the left in the drawings by reason of engagement of the arm with the shoulder 51. However, after the arm has been rocked about its pivotal point to position between the last severed slice and the knife of the slicing machine, the arm is then free to be moved rearwardly of the chute to the position in which it is shown in Figure 6. In this movement towards the rear end of the chute, the carriage 40 upon which the arm is mounted, slides upon the trackway 41 and the sliding movement of the arm moves the severed slices along the tray to a position remote with respect to the knife of the slicing machine. It will be noted that as the arm moves rearwardly of the receiving tray, by reason of engagement of the portion 35 of the arm beneath the bottom wall of the tray, at a point to the rear of the shoulder 51, the arm is prevented from swinging about its pivotal point, and consequently, the extension 30 of the arm is maintained in engagement with the last slice severed by the machine.

After the afore-mentioned operation has been completed the arm is moved forwardly of the receiving tray or to the right in the drawings, and as it reaches the extent of its forward sliding movement, under the influence of the coil spring 43, the arm will move automatically to its normal position of rest in which it is elevated, as illustrated in Figure 1.

In attaching the U-shaped member 57 to the slicing machine, the base portion 66 thereof is positioned closely adjacent the knife 67 of the slicing machine, which knife is shown in Figures 3 and 4 by dot and dash lines. By this arrangement of parts, it will be apparent that the base portion 66 of the U-shaped member 57 provides a rest or support for the bottom edge of the slice as it is being severed from the loaf by the knife of the slicing machine. This I consider an important feature, for the reason that the support provided by the base member 66 of the U-shaped member 57 insures a clean cutting along the bottom edge or face of the loaf and produces a slice whose bottom edge is clean and even, as distinguished from the ragged and often broken lower edge of the slices as produced when such a support is not provided.

Therefore, it will be obvious that the U-shaped member 57 performs two functions; first, it provides means for attaching the receiving tray to the slicing machine; and second, it provides a support for the slice as it is being severed from the loaf and insures a clean and unbroken bottom edge upon the severed slice.

If desired, the tray may be provided near one edge with a series of openings 70 through which the crumbs incident to the slicing of the loaf may fall, thus insuring a clean condition closely adjacent the knife of the machine.

From the foregoing it will be apparent that the present invention provides a new and improved receiving tray for slicing machines and, as in the case of bread slicing machines, provides a mechanism by which a better production, to wit, clean and unbroken slices, may be produced.

While the invention has been herein described in a preferred form, it is obvious that it may be practiced in other forms without departing from the spirit or scope thereof.

Having thus described the invention, what is claimed as new is:

1. A receiving tray for bread slicing machines comprising a chute-like member, means for mounting said tray on a bread slicing machine in position to receive the severed slices of bread therefrom, a trackway mounted beneath said tray, a carriage slidably mounted on said trackway, and an arm pivotally mounted on said carriage and adapted for movement to position between the last severed slice of bread and the knife of the bread slicing machine for moving all of the slices of bread in the receiving tray longitudinally of the tray.

2. A receiving tray for bread slicing machines comprising a chute-like member, means for mounting said tray on a bread slicing machine in position to receive the several slices of bread therefrom, a trackway mounted beneath said tray, a carriage slidably mounted on said trackway, an arm pivotally mounted on said carriage and movable to position between the last severed slice of bread and the knife of the bread slicing machine for moving all of the slices of bread in the receiving tray longitudinally thereof, and means for holding said pivoted arm normally out of the path of the slices of bread delivered to the tray from the bread slicing machine.

3. A receiving tray for slicing machines comprising a chute-like member, means for attaching said tray to a slicing machine in position to receive slices of material cut thereby, means carried by the tray and pivotally mounted thereon for swinging movement to position for engagement with one of the slices delivered to the tray by the slicing machine, said means also being slidable along the tray to move a plurality of severed slices longitudinally of the tray, means for holding said slice moving means normally out of the path of travel of the slices as they are delivered from the slicing machine, and means for preventing movement of the slice moving means longitudinally of the tray when the slice moving means is in its normal position.

4. A receiving tray for slicing machines comprising in combination, a chute-like member, means for mounting said tray upon a slicing machine in position to receive a plurality of slices cut thereby, a trackway carried by said tray, a carriage slidably mounted on said trackway, an arm pivotally mounted on said carriage for swinging movement to position for engagement with one of the slices delivered to the tray by the slicing machine, said arm being slidable along the tray with said carriage to move a plurality of severed slices longitudinally of the tray, and means for holding said pivoted arm in a normal position of rest out of the path of travel of the severed slices as they are delivered from the slicing machine.

5. A receiving tray for slicing machines comprising in combination, a chute-like member, means for mounting said tray upon a slicing machine in position to receive a plurality of slices cut thereby, a trackway carried by said tray, a carriage slidably mounted on said trackway, an arm pivotally mounted on said carriage for swinging movement to position for engagement with one of the slices delivered to the tray by the slicing machine, said arm being slidable along the tray with said carriage to move a plurality of severed slices longitudinally of the tray, means for holding said pivoted arm in a normal position of rest out of the path of travel of the severed slices as they are delivered from the slicing machine, and means for preventing movement of said carriage and said arm longitudinally of the tray when the arm is in its normal position of rest.

6. A receiving tray for slicing machines comprising in combination, a chute-like member, means for mounting said tray upon a slicing machine in position to receive a plurality of slices cut thereby, a trackway carried by said tray, a carriage slidably mounted on said trackway, an arm pivotally mounted on said carriage for swinging movement to position for engagement with one of the slices delivered to the tray by the slicing machine, said arm being slidable along the tray with said carriage to move a plurality of severed slices longitudinally of the tray, means for holding said arm in a normal position of rest out of the path of travel of the severed slices as they are delivered from the slicing machine, and means for preventing pivotal movement of said arm while it is moving longitudinally of the tray.

7. A receiving tray for slicing machines comprising in combination, a chute-like member, means for mounting said tray upon a slicing machine in position to receive a plurality of slices cut thereby, a trackway carried by said tray, a carriage slidably mounted on said trackway, an arm pivotally mounted on said carriage for swinging movement to position for engagement with one of the slices delivered to the tray by the slicing machine, said arm being slidable along the tray with said carriage to move a plurality of severed slices longitudinally of the tray, means for holding said arm in a normal position of rest out of the path of travel of the severed slices as they are delivered from the slicing machine and a single means for preventing longitudinal movement of the carriage and the arm when the arm is in its normal position of rest and for preventing pivotal movement of said arm during movement thereof longitudinally of the tray.

MORRIS BRUSTOWSKY.